(12) United States Patent
Zettler et al.

(10) Patent No.: US 8,496,375 B2
(45) Date of Patent: Jul. 30, 2013

(54) PYROMETER ADAPTED FOR DETECTING UV-RADIATION AND USE THEREOF

(75) Inventors: Joerg-Thomas Zettler, Berlin (DE); Tobias Schenk, Berlin (DE); Jens Zilian, Berlin (DE)

(73) Assignee: Laytec Aktiengesellschaft, Berlin (DE)

( * ) Notice: Subject to any disclaimer, the term of this patent is extended or adjusted under 35 U.S.C. 154(b) by 372 days.

(21) Appl. No.: 12/858,918

(22) Filed: Aug. 18, 2010

(65) Prior Publication Data

US 2011/0064114 A1    Mar. 17, 2011

(30) Foreign Application Priority Data

Sep. 17, 2009  (DE) .......................... 10 2009 029 560
Feb. 8, 2010  (EP) ...................................... 10152971

(51) Int. Cl.
*G01J 5/00* (2006.01)
*G01J 5/10* (2006.01)
*G01J 5/60* (2006.01)

(52) U.S. Cl.
USPC ......................................... 374/121; 374/127

(58) Field of Classification Search
USPC .................... 374/121, 123, 127, 130; 356/43, 356/45

See application file for complete search history.

(56) References Cited

U.S. PATENT DOCUMENTS

| 3,643,093 | A |   | 2/1972 | Dietz |  |
|---|---|---|---|---|---|
| 4,731,881 | A | * | 3/1988 | Geller | 398/202 |
| 5,372,426 | A | * | 12/1994 | Broudy et al. | 374/127 |
| 7,381,966 | B2 | * | 6/2008 | Starikov et al. | 250/372 |
| 2005/0213092 | A1 | * | 9/2005 | MacKinnon et al. | 356/336 |
| 2007/0035819 | A1 | * | 2/2007 | Bahatt et al. | 359/366 |
| 2009/0218504 | A1 | * | 9/2009 | Pelizzo et al. | 250/372 |

FOREIGN PATENT DOCUMENTS

| FR | 2629201 | 9/1989 |
|---|---|---|
| JP | 51128583 | 11/1976 |
| JP | 62054129 | 3/1987 |

* cited by examiner

*Primary Examiner* — R. A. Smith
(74) *Attorney, Agent, or Firm* — Novak Druce Connolly Bove + Quigg LLP

(57) ABSTRACT

A pyrometer that is adapted for detecting radiation in the range of 250 to 450 nm is disclosed. The pyrometer can be used for determining the temperature of a matter thermally emitting only ultraviolet-radiation. In particular, the pyrometer can include: a detector having an active area adapted for measuring thermal radiation, a longpass filter having a cut-off wavelength in the range of 400 to 450 nm, means adapted for alternately activating and deactivating the longpass filter, means adapted for measuring a first thermal radiation signal when the longpass filter is deactivated and adapted for measuring a second thermal radiation signal when the longpass filter is activated, and means adapted for determining a temperature corresponding to the measured thermal radiation from a difference of the first radiation signal and the second radiation signal.

18 Claims, 5 Drawing Sheets

PYROMETER ADAPTED FOR DETECTING UV-RADIATION AND USE THEREOF

FIELD OF THE INVENTION

The present invention relates to a pyrometer which is adapted for detecting radiation in the range of 250 to 450 nm. The present invention further relates to a method of determining the absolute temperature of a substrate from radiation in the range of 250 to 450 nm. In more particular, the method according to the present invention sequentially transmits first only radiation having a wavelength greater than 450 nm to a detector (partial transmittance mode, blocking all wavelength below 450 nm) and than transmits all radiation (full transmittance mode) to the detector. The temperature corresponding to the measured radiation in the range of 250 to 450 nm is then determined from the difference between the measured radiation signals of full transmittance mode and partial transmittance mode.

BACKGROUND OF THE INVENTION

The measurement of the temperature of a semiconducting wafer belongs to the most important tools during quality control in semiconductor production. Usually the temperature is measured contactlessly by use of a pyrometer which is adapted to intercept and measure the thermal radiation which is emitted by the semiconducting wafer. Said thermal radiation is then used to calculate the temperature of the semiconducting wafer.

Conventional pyrometers are adapted to detect thermal radiation in the range of 700 nm to 12 µm, i.e. radiation in the infrared spectrum. That is, the conventional pyrometers are sensitive to infrared radiation. According to Planck's law, the intensity of thermal infrared visible radiation is significantly higher than the intensity of e.g. thermal ultraviolet radiation (also referred to as UV-radiation). In the sense of the present invention, UV-radiation is radiation in the range of 250-450 nm, more preferably 300-420 nm and still more preferably 400-410 nm.

Some semiconducting wafers, such as silicon-carbide, sapphire or gallium-nitride wafers, are transparent in the infrared spectrum and therefore do not emit infrared radiation. According to the present invention, the expression "transparent" is understood in that an optical transmittance is higher than 50%, preferably higher than 70% and more preferably higher than 90%. Such infrared-transparent wafers are very important for industrial production of optoelectronic devices. For example such wafers are needed for the production of blue and white light-emitting diodes (LEDs) as well as for the production of III-nitride power electronics based on silicon-carbide substrates. During manufacturing of such wafers the required accuracy of temperature control has to be better than ±1K. Due to the absence of significant infrared radiation from the infrared-transparent wafers, conventional pyrometers cannot be used for wafer temperature sensing. In some cases (SiC, GaN) the temperature is conventionally measured by detecting the band edge shift. However, said method of temperature measurement does not meet the above discussed accuracy requirements.

SUMMARY OF THE INVENTION

It is therefore an object of the present invention to provide a pyrometer and a method for determining the temperature of a matter thermally emitting only ultraviolet-radiation which overcome the disadvantages of the prior art. In particular it is an object of the present invention to provide a pyrometer and a method for determining the temperature of infrared-transparent semiconducting wafers. A further object of the present invention is to provide a contactless and real-time temperature determination for the LED production and III-nitride power electronics production having a higher accuracy compared to the prior art.

The present invention provides a pyrometer which is adapted for detecting radiation in the range of 250 to 450 nm and a method which uses said wavelength range for temperature measurement. The pyrometer and the method for determining a temperature of a substrate (also referred to as "sample") or a matter are disclosed in the independent claims. Preferred embodiments of the invention are disclosed in the dependent claims.

According to a first aspect, the present invention discloses a pyrometer adapted for detecting radiation in the range of 250 to 450 nm comprising, a 'solar blind' detector having an active area for detecting (predominantly short-wavelength) thermal radiation, a longpass filter having a cut-off wavelength in the range of 400 to 450 nm, means for alternately activating and deactivating the longpass filter, means for measuring a first thermal radiation signal detected with the deactivated longpass filter and a second thermal radiation signal detected with the activated longpass filter and means for determining a temperature of a substrate (or a radiation source of which the temperature has to be determined) from the difference of the first radiation signal and the second radiation signal.

Even though it would appear to be a suitable approach to directly detect the thermal radiation of substrates, such as the semiconducting wafers by measuring only wavelengths shorter than the band edge, this approach fails to produce reliable result for the following reasons: although detectors are available which are adapted to detect UV-radiation, a sufficiently precise measurement of the thermal radiation within the range of 250 to 450 nm is not possible because the UV-radiation signal is always offseted by an infrared radiation signal of a much higher intensity. According to Planck' law, the integral intensity of thermal radiation in the range of 450 nm to 2 µm at typical process temperatures of 800° C. is approx. 9 orders of magnitude higher than the intensity of the radiation to be detected. Said 9 orders of magnitude offset typically also exists for vis-infrared-transparent semiconducting wafers, e.g. due to a hot, IR/vis-absorbing susceptor emitting this vis-infrared thermal radiation through the IR/vis-transparent wafer.

Furthermore, spectral filters for completely blocking infrared radiation and transmitting UV-radiation are not yet available due to problems based on the physical properties of the materials which can be used. Even when using a plurality of such optical filters for blocking infrared radiation, the remaining intensity of the infrared radiation is approx. 2 magnitudes higher than the intensity of the UV radiation to be detected. Thus, a selective detection of the short UV-radiation using optical filters is not possible. According to the above explanation, conventional pyrometers detect thermal radiation only in the range of 700 nm to 12 µm and the temperature of infrared-transparent substrates is conventionally determined by detecting their band edge shift with temperature.

According to the present invention, a pyrometer is disclosed which combines a longpass filter having a cut-off wavelength in the range of 400 to 450 nm and a detector which is able to detect both UV-radiation and IR-radiation. It was found that a pyrometer can be provided which is able to detect radiation in the range of 250 to 450 nm by alternately activating and deactivating the longpass filter. After detection of both radiation signals—a first signal where the longpass filter is deactivated and a second signal where the longpass filter is activated—a difference signal is calculated which represents the thermal radiation in the range of 250 to 450 nm.

In a preferred embodiment the detector which is used in the pyrometer of the invention has a maximum radiation sensitivity in the range of 200 to 500 nm, preferably in the range of 250 to 450 nm, more preferred in the range of 280 to 420 nm. According to the present invention the expression "maximum radiation sensitivity" is understood in that the detector is adapted to short wavelengths. Using a detector which has a maximum radiation sensitivity in the UV-spectrum (solar-blind detector) is advantageous to reduce the noise of the difference signal. In a further preferred embodiment of the invention the detector does not detect the (VIS-IR) spectrum. Preferably the cut-off wavelength of the detector is in the range of 400 to 800 nm, more preferred in the range of 400 to 600 nm, more preferred in the range of 400 to 500 nm and still more preferred in the range of 400 to 450 nm.

According to the present invention the expression "cut-off wavelength of a detector" is understood in that the sensitivity for radiation having a wavelength greater than said cut-off wavelength is significantly lower than for radiation having a wavelength lower than said cut-off wavelength. In particular the sensitivity is 10 times lower, preferably $1 \times 10^2$ times lower, more preferred $1 \times 10^3$ times lower and most preferred $1 \times 10^4$ times lower. In a most preferred embodiment the detector is an ideal solar-blind-detector. Using said detector in the pyrometer of the present invention, the intensity of IR-radiation which is detected can be attenuated in the range of two to three magnitudes.

Further, the expression "cut-off wavelength of a longpass filter" is understood in that radiation having a wavelength greater than said cut-off wavelength substantially passes through the longpass filter while radiation having a wavelength lower than said cut-off wavelength is substantially blocked by the longpass filter. Accordingly, the expression "cut-off wavelength of a shortpass filter" is understood in that radiation having a wavelength lower than said cut-off wavelength substantially passes through the shortpass filter while radiation having a wavelength greater than said cut-off wavelength is substantially blocked by the shortpass filter. The cut-off wavelength can be a discrete wavelength or a wavelength range, in particular a range of 2 to 20 nm, preferably a range of 2 to 10 nm, more preferred a range of 2 to 5 nm. If the cut-off wavelength is a wavelength range, the intensity of radiation of the wavelengths is blocked increasingly. Preferably, radiation which substantially passes through a filter has an intensity of more than 70%, more preferably more than 85% and still more preferably more than 95% of the initial intensity; and radiation which is substantially blocked by a filter has an intensity of lower than 10-3, more preferably lower than 10-6 and still more preferably lower than 10-9 of the initial intensity.

In a preferred embodiment of the invention the cut-off wavelength of the longpass filter is in the range of 400 to 420 nm. Suitable longpass filters are colored optical glasses.

The detector used for the pyrometer of the present invention comprises an active area. The active area is the part of the detector which is sensitive to the incoming radiation in terms of a generated sensing signal. Preferably, the active area is shielded against scattered radiation so that only radiation from one direction is detected, more preferably the incoming radiation is channeled by a radiation window.

In a preferred embodiment in the activated state, the longpass filter is positioned such in front of the active area of the detector that radiation to be detected passes through the longpass filter before reaching the active area of the detector and in the deactivated state the longpass filter is positioned such that radiation to be detected does not pass through the longpass filter before reaching the active area of the detector. In particular the longpass filter is positioned in front of the active area of the detector.

The pyrometer of the present invention further comprises a longpass filter having a cut-off wavelength in the range of 400 to 450 nm. The cut-off wavelength of the longpass filter is preferably close to the wavelength of the thermal UV-radiation to be detected.

The pyrometer further comprises means for alternately activating and deactivating the longpass filter. In a preferred embodiment of the invention said means comprise a motor, wherein the motor dislocates the longpass filter from the active area of the detector. Thus, in the activated state of the longpass filter, incoming radiation passes through the longpass filter and in the deactivated state of the longpass filter, the incoming radiation enters the detector directly without passing through the longpass filter. Therefore the longpass filter of the present invention is used as a light chopper.

Preferably, the longpass filter comprises a plurality of segments, wherein gaps are arranged between adjacent filter segments such that a relative movement between the longpass filter and the active area of the detector results in a sequential activation and deactivation of the longpass filter. More preferred the longpass filter is a rotating fan, which is driven by the motor. Thus, the movement of the segments of the fan modulates the optical path of the detected thermal radiation. The angular velocity of the rotating fan is adapted to the acquisition time interval for the activated and the deactivated state.

The pyrometer according to the present invention preferably further comprises a shutter, i.e. means for completely blocking all radiation from the active area of the detector for electronic back-ground signal subtraction.

The pyrometer according to the present invention further comprises means for measuring a first thermal radiation signal detected with the deactivated longpass filter and a second thermal radiation signal detected with the activated longpass filter. Said means comprise means for activating and deactivating the data acquisition of the detector. Said means preferably further comprise means for synchronizing the activation state of the longpass filter and the data acquisition of the detector. In a preferred embodiment of the invention said means for measuring the first and the second signal is a data processing unit and/or personal computer.

The pyrometer according to the present invention further comprises means for determining a temperature of a substrate from the difference of the first radiation signal and the second radiation signal. Said means calculates the difference of the measured signals and converts the results into a temperature. In a preferred embodiment of the invention said means for determining the temperature is a data processing unit and/or personal computer. Preferably, for determining the temperature of an IR/vis-transparent substrate from the difference of the first radiation signal and the second radiation signal, the optical transmittance of the longpass filter for infrared radiation is taken into account. More preferably, the difference of the first radiation signal and the second radiation signal is taken after dividing the second radiation signal by the optical transmittance of the longpass filter for vis/IR radiation.

In another embodiment of the present invention the pyrometer comprises at least one bandpass filter which is positioned between the longpass filter and the detector. Preferably the longpass filter, the bandpass filter and the detector are arranged along a straight line. That means the bandpass filter is positioned in front of the detector and adjacent to the longpass filter having the activated and the deactivated state. Thus, the incoming thermal radiation first passes the longpass filter and then the bandpass filter before being detected onto the active area of the detector.

A suitable bandpass filter according to the present invention has a central wavelength in the range of 350 to 500 nm, preferably in the range of 380 to 450 nm, more preferred in the range of 400 to 420 nm. The central wavelength is the wavelength centered between the upper and lower band-pass cut-off wavelength. In a preferred embodiment of the invention the bandpass filter completely attenuates all wavelength outside the passband. The band-pass filter according to the invention preferably passes a range of wavelengths, in particular a range of 1 to 40 nm, more preferred a range of 1 to 30 nm and most preferred a range of 1 to 20 nm. Intensity attenuation outside the passband usually increases gradually in a range of 1 to 10 nm, preferably in the range of 1 to 5 nm, more preferred in the range of 1 to 3 nm. Using a bandpass filter in the pyrometer of the invention the intensity of IR-radiation which is blocked by said bandpass filter can be attenuated in the range of two to three magnitudes. Suitable bandpass filters according to the invention are multi-layer stacks with additional blocking materials.

In another embodiment of the invention the pyrometer comprises at least one shortpass filter which is positioned on a side of the longpass filter which faces away from the detector. Preferably the shortpass filter is arranged along a straight line with the (activated) longpass filter and the detector. Thus, part of the incoming thermal IR/vis-radiation is blocked by the shortpass filter before passing the longpass filter and being detected at the active area of the detector.

A suitable shortpass filter has a cut-off wavelength in the range of 700 to 800 nm, preferably in the range of 600 to 700 nm and more preferred in the range of 500 to 600 nm.

In a preferred embodiment of the invention the cut-off wavelength of the shortpass filter is in the range of 500 to 600 nm. Using a shortpass filter in the pyrometer of the invention the intensity of IR-radiation which is blocked by said shortpass filter can be attenuated in the range of one to two magnitudes. Suitable shortpass filters are heat reflecting glasses.

In another embodiment of the present invention the pyrometer comprises at least one dichroic beam splitter which is positioned on a side of the longpass fitter which faces away from the detector. Preferably the dichroic beam splitter is arranged along a straight line with the longpass filter and the detector, i.e. the dichroic beam splitter is positioned in front of the shortpass filter. Thus, the incoming thermal radiation passes first the dichroic beam splitter and then the shortpass filter before being detected at the active area of the detector. In particular the incoming thermal radiation is tilted in a right angle, so that only reflected radiation is channelled to the detector. If said beam splitter is used the thermal radiation source and the detector span a right angle.

A suitable dichroic beam splitter reflects radiation having a wavelength smaller than 500 nm, preferably smaller than 500 nm, more preferred smaller than 450 nm, and most preferred smaller than 420 nm. With respect to the dichroic beam splitter the expression "reflection of radiation" means that radiation having a smaller wavelength is reflected and radiation having a greater wavelength passes through the splitter. Reflection means that 70% of the radiation, preferably 85% of the radiation, more preferred 95% of the radiation and most preferred >99.9% of the radiation with smaller wavelengths is reflected. The reflected wavelength(s) can be a range of wavelengths, preferably ranging down to the minimum detection wavelength of the detector. In a preferred embodiment of the invention the splitting wavelength of the dichroic beam splitter is in the range of 420 to 450 nm. Using a dichroic beam splitter in the pyrometer of the present invention the intensity of IR-radiation which is reflected by said dichroic beam splitter can be attenuated in the range of one to three magnitudes. Suitable dichroic beam splitters are beam splitting cubes or plates with integrating optical thin-film structures for 45° beam-splitting.

According to another embodiment of the invention the pyrometer further comprises a shutter. The shutter is preferably located between the longpass filter and the detector. Preferably the longpass filter, the amplifier and the detector are arranged along a straight line. Preferably the shutter is positioned directly in front of the active area of the detector. A suitable shutter is adapted to compensate effects due to the thermal dark-current of the detector.

In a preferred embodiment of the present invention the pyrometer comprises a dichroic beam splitter, a shortpass filter, a longpass filter, a bandpass filter, a shutter and a detector having the maximum radiation sensitivity in the range of 250 to 450 nm, wherein the components are preferably positioned in a straight line. More preferred the components are arranged in the mentioned order. In a more preferred embodiment the detector has a maximum radiation sensitivity in the range of 280 to 420 nm.

Using the pyrometer of the present invention it is possible to detect the thermal radiation having wavelengths in the range of 250 to 450 nm although the intensity of said radiation is very low in comparison to the initially superimposed infrared radiation. Due to filter combination a decrease of the intensity of infrared radiation is achieved up to seven magnitudes. Further combining the detector and the method of measuring a difference value thermal UV-radiation (between state long-pass filter active and state long-pass filter inactive) can be detected in high resolution so that a robust and sensitive method for temperature measurement is provided showing a wafer temperature resolution of 0.1K without any offset contribution from the susceptor below.

The present invention further relates to a method for detecting a temperature of a substrate emitting thermal radiation using radiation having a wavelength in the range of 250 to 450 nm comprising:

a) measuring a thermal radiation emitted by the substrate during a first acquisition time interval as a first radiation signal, b) blocking radiation emitted by the substrate having a wavelength shorter than 450 nm and measuring the residual thermal radiation emitted by the susceptor below the substrate during a second acquisition time interval as a second radiation signal, c) calculating a third radiation signal as a difference of the first and second radiation signal and d) determining the temperature of the substrate from the third thermal radiation signal.

According to the method of the present invention the first thermal radiation signal which is measured during a first acquisition time interval comprises the complete thermal spectrum which can be detected by the detector used in the pyrometer of the present invention. For measuring the second radiation signal a part of the thermal radiation spectrum is blocked. According to the invention thermal radiation having a wavelength shorter than 450 nm is blocked by a longpass filter. In a preferred embodiment of the invention for measuring of the second radiation signal thermal radiation having a wavelength shorter than 420 nm, more preferred shorter than 400 nm is blocked by a longpass filter.

According to the invention the term "sample" (also referred to as "substrate") is used for every material, matter, body or radiation source which emits thermal radiation, in particular which emits at least thermal radiation in the range of 250 to 450 nm.

In a preferred embodiment of the method of the present invention the first and second signal acquisition time interval is in the range of 1 to 1000 ms, preferably in the range of 10 to 100 ms. The acquisition time intervals of the first and the second radiation signal are determined independently. Individual signal acquisition time depends on signal intensity, wherein higher signal intensity requires a shorter acquisition time and vice versa. In general shorter acquisition time intervals are preferred for optional temperature feed-back control. In a preferred embodiment of the invention the ratio of the first acquisition time interval to the second acquisition time interval is in the range of 0.2 to 5.0, preferably in the range of 0.5 to 2.0 and more preferred the ratio is 1.0.

In another embodiment of the invention the first and the second radiation signal are measured repeatedly and the measured values are averaged to determine the mean value. Then the third radiation signal is calculated from the mean value of the first and the second one. Use of the mean values of repeated measurements further increases the resolution and accuracy of the method of the present invention. Preferably the first and second radiation signals are measured 2 to 20 times, preferably 2 to 10.

Preferably calculation of the third radiation signal is performed as shown by equations I to III.

In the deactivated state of the longpass filter, i.e. the longpass filter is located outside the optical path, the intensity $I_a$ detected by the detector is given by:

$$I_a = I_{IR} + I_{<420\,nm} \quad (I),$$

wherein $I_{IR}$ is intensity of the infrared radiation signal and $I_{<420\,nm}$ is the intensity of the radiation in the range of 250-450 nm, more preferably 250-420 nm and still more preferably 250-400 nm.

In the activated state of the longpass filter, i.e. the longpass filter is located within the optical path, the intensity $I_b$ detected by the detector is given by:

$$I_b = I_{IR} * T \quad (II),$$

wherein $I_{IR}$ is intensity of the infrared radiation signal and T is the optical transmittance of the longpass filter for infrared radiation.

Using equation I and II the intensity of the radiation having a wavelength smaller than 450 nm (or 420 nm or 400 nm, respectively) can be calculated by:

$$I_{<420\,nm} = I_a - \frac{I_b}{T}. \quad (III)$$

From the third radiation signal, preferably calculated according to equation III, the temperature of the substrate can be determined according to Planck's law.

Calculation of the third radiation signal and determination of the temperature is preferably done automatically, in particular using a computer supported evaluation algorithm.

In a preferred embodiment of the method of the invention the intensity of the detected thermal IR/vis radiation, in particular the detected thermal radiation greater than 450 nm (or 420 nm or 400 nm, respectively), is additionally attenuated at least $10^{-1}$ times, preferably at least $10^{-2}$ times, more preferred at least $10^{-3}$ times as compared to detection without the longpass filter active/inactive algorithm.

To attenuate the thermal radiation it is detected after passing at least one filter, preferably after passing one or more shortpass filters, one or more longpass filters, one or more bandpass filters, one or more dichroic beam splitters or a combination thereof. Good total attenuation of better $10^{-9}$ is preferably achieved by combining one of each of the mentioned filters.

The present invention relates further to a method for detecting a temperature of a substrate emitting thermal radiation using radiation having a wavelength in the range of 250 to 450 nm (or 420 nm or 400 nm, respectively) using a pyrometer according to the present invention.

The method according to the invention can be used to determine the temperature of any substrate emitting thermal radiation or any other source of thermal radiation. Suitable substrates whose temperature is determined are semiconducting wafers, preferably semiconducting wafers being transparent in the spectral range from 450 nm to 2 µm, and more preferred said semiconducting wafers being mounted onto a susceptor emitting infrared radiation. Suitable semiconducting wafers are for instance III-nitride-wafers, sapphire-wafers, silicon-carbide wafers or gallium-nitride wafers. In a preferred embodiment of the invention temperature detection is done during manufacturing of light emitting diodes (LEDs), preferably blue and/or white LEDs or during manufacturing of III-nitride power electronics.

Using the method of the present invention it is possible to detect the thermal radiation emitted by a substrate having wavelength in the range of 250 to 450 nm (or 420 nm or 400 nm, respectively) although the intensity of said radiation is very low in comparison to the initially superimposed infrared radiation. However, a robust and sensitive method for temperature measurement is provided having a resolution of 0.1K.

The disclosed pyrometer preferably shows an effective wavelength in the range of 400 to 420 nm. Thus, the temperature of a wafer, for example of a silicone-carbide wafer, can be determined without any artifacts. During manufacturing LEDs using sapphire wafers, the gallium-nitride buffer layer having a thickness of about 2 µm is used to generate sufficient thermal radiation in the range of 250 to 450 nm.

BRIEF DESCRIPTION OF THE DRAWINGS

In the following the invention will be described in further detail. The examples given are adapted to describe the invention, but not to limit the invention in any case.

DETAILED DESCRIPTION OF THE INVENTION

Figure 1A:
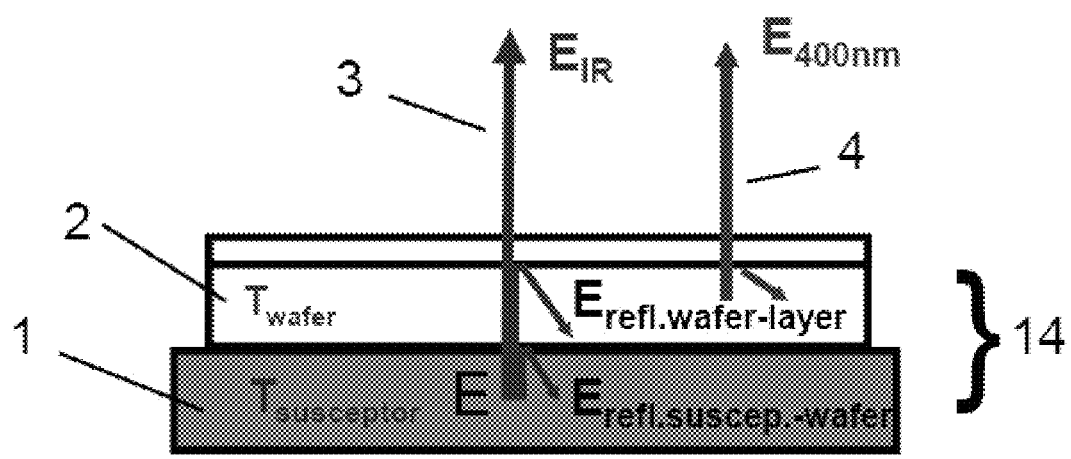
FIG. 1A shows the thermal radiation of a sample 14 consisting of a semiconducting wafer 2 mounted onto a susceptor 1.

FIG. 1A shows the thermal radiation 3, 4 of a semiconducting silicon-carbide or Gallium-Nitride wafer 2 mounted onto a graphite-susceptor 1. During semiconductor production, for example for the production of blue or white LEDs, the semiconducting wafer 2 is mounted onto the susceptor 1. The semiconducting wafer 2 and the susceptor 1 represent the sample 14 for which the temperature has to be determined. During the industrial process the temperature of the substrate 14 is about 800° C. Therefore the semiconducting wafer 2 and the susceptor 1 emit thermal radiation 3, 4. The spectral distribution of the thermal radiation 3, 4, i.e. the wavelengths emitted by the semiconducting wafer 2 and the susceptor 1 strongly depend on the composition of the material. The susceptor 1 is e.g. made of graphite emitting infrared thermal radiation 3. In contrast, the semiconducting wafer 2 is transparent for infrared radiation 3. Typical semiconducting wafers 2 are made from silicon-carbide, gallium-nitride (GaN) or GaN-on-sapphire. These materials emit UV-thermal radiation 4. The infrared thermal radiation 3 emitted by the susceptor 1 can pass the semiconducting wafer 2 without significant attenuation.

Figure 1B:
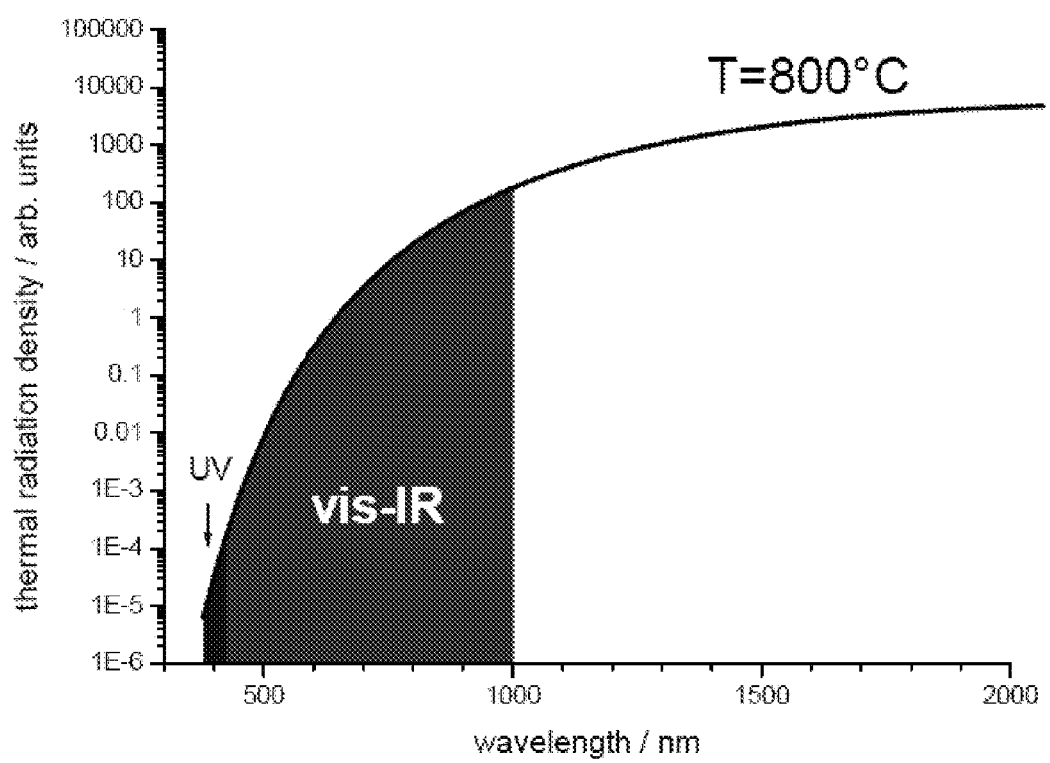
FIG. 1B shows the intensity distribution of the sample 14 at a temperature of 800° C.

FIG. 1B shows the intensity distribution of the substrate 14 shown in FIG. 1A at a temperature of 800° C. The intensity of thermal radiation 3, 4 emitted by a sample 14 at a given temperature depends on the wavelength. The intensity distribution is given by Planck's law. At 800° C. the total intensity of the vis/IR radiation 3 is more than nine magnitudes higher than intensity of UV-radiation 4. The total intensity refers to the respective area below the Plack curve.

Figure 2A:
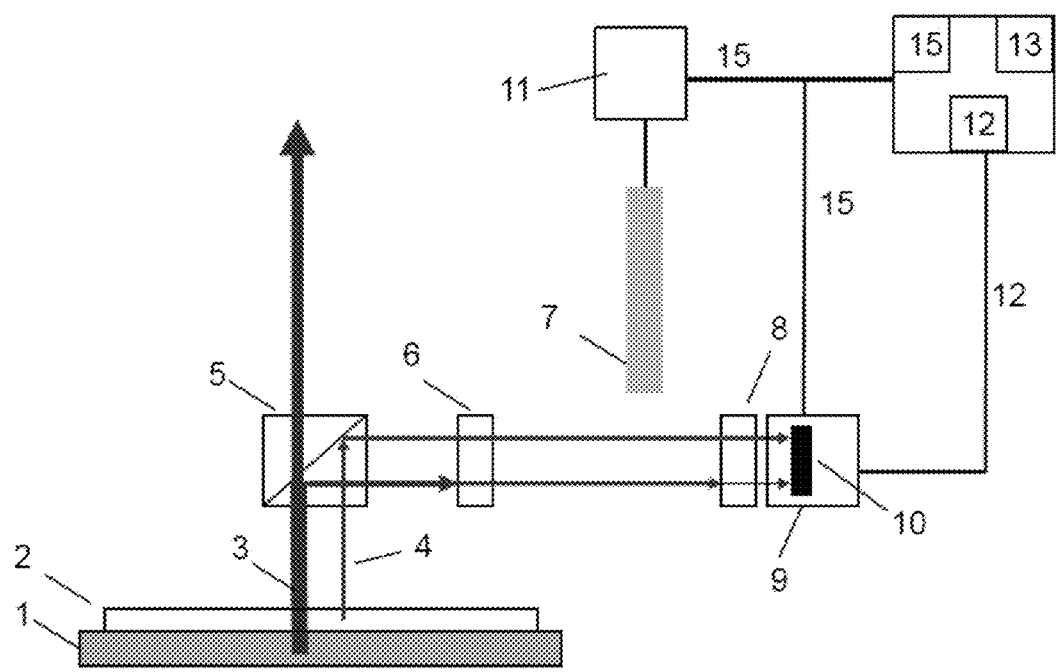
FIG. 2A shows the optical path of thermal vis/IR radiation 3, thermal UV radiation 4 using a pyrometer of the invention, wherein the longpass filter 7 is deactivated.

FIG. 2A shows the optical path of thermal radiation 3, 4 using a pyrometer of the invention, wherein a longpass filter 7 is in a deactivated state. Infrared thermal radiation 3 emitted by the susceptor 1 is (partly) reflected by a dichroic beam splitter 5. The dichroic beam splitter 5 reflects radiation having a wavelength smaller than 500 nm. Thus, most of the infrared thermal radiation 3 passes the dichroic beam splitter 5 and is not guided to a detector 9. Intensity of infrared radiation 3 is decreased by two orders of magnitude due to the dichroic beam splitter 5.

The thermal radiation 4 in the range of 250 to 450 nm which is emitted by the semiconducting wafer 2 is completely or substantially reflected by the dichroic beam splitter 5 and guided at an active area 10 of the detector 9. After being reflected by the dichroic beam splitter 5, the thermal radiation 3, 4 emitted by the sample 14 passes a shortpass filter 6 which has a cut-off wavelength of 600 nm. Thus, intensity of infrared thermal radiation 3 is further reduced by two orders of magnitude.

Having passed the shortpass filter 6, the thermal radiation 3, 4 passes a longpass filter 7 having two different states, namely the activated state (FIG. 2B) and the deactivated state (FIG. 2A). Activation and deactivation of the longpass filter 7 is performed by means 11 for alternately activating and deactivating the longpass filter 7. During the deactivated state (FIG. 2A) radiation of any wavelength is able to pass the longpass filter 7. According to the preferred embodiment of the invention the longpass filter 7 is a rotating fan driven by a motor 11. In the activated state (FIG. 2B) the filter 7 is located within the optical path and in the deactivated state (FIG. 2A) the filter 7 is located outside the optical path.

After passing the longpass filter 7, the thermal radiation 3, 4 emitted by the substrate 14 passes a bandpass filter 8. The bandpass filter 8 has a passband of 40 nm width with a central wavelength of 410 nm. By passing the bandpass filter 8 the infrared thermal radiation 3 is attenuated by two orders of magnitude. After passing the bandpass filter 8, the thermal radiation 3, 4 is detected at the active area 10 of the detector 9. The active area 10 has maximum sensitivity in the range of 280 to 420 nm. Due to the special sensitivity of the detector 9 vis/IR thermal radiation 3 is further attenuated by two orders of magnitude.

Figure 2B:
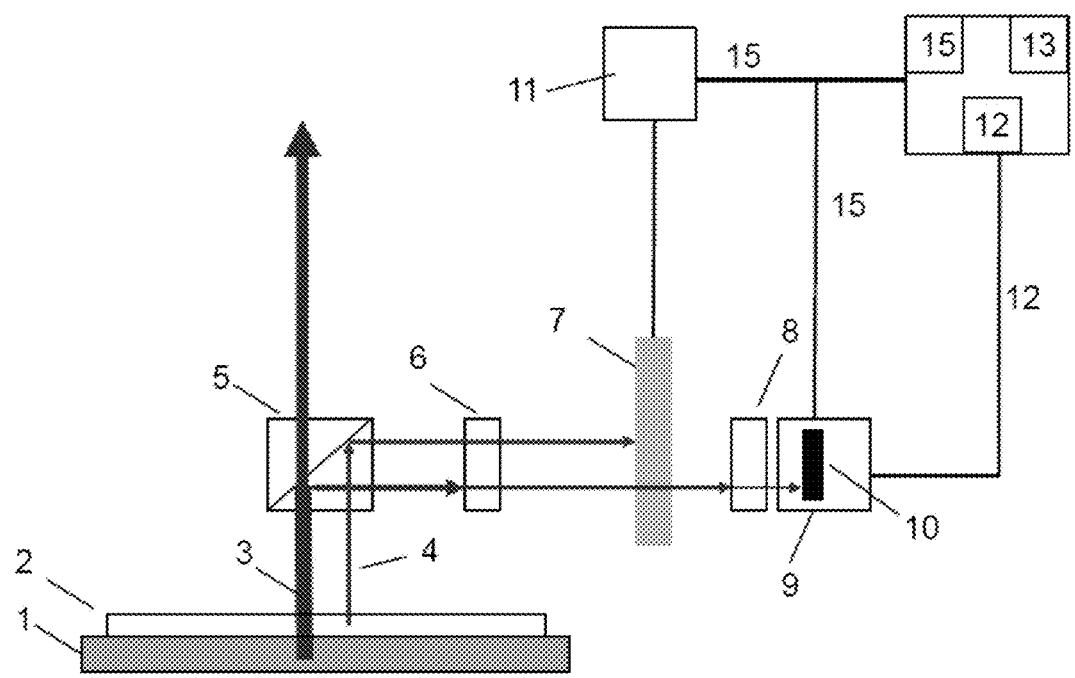
FIG. 2B shows the optical path of thermal vis/IR radiation 3, thermal UV radiation 4 using a pyrometer of the invention, wherein the longpass filter 7 is activated.

FIG. 2B shows the optical path of thermal radiation 3, 4 using a pyrometer of the invention, wherein the longpass filter 7 is activated. Reference signs are used according to FIG. 2A. When the longpass filter 7 is activated, the intensity of the thermal radiation 4 in the range of 250 to 450 nm is blocked by the longpass filter 7 by >99.9%.

For determining the temperature of the substrate 14, a first thermal radiation signal is measured in the deactivated state (FIG. 2A) and a second thermal radiation signal is measured in the activated state (FIG. 2B). Acquisition time for measuring the first and the second signal was 100 ms. Means 12 for measuring the first and the second thermal radiation signal are connected with the detector 9. Means 15 for synchronizing the activation state of the longpass filter 7 and data acquisition of the detector 9 are connected with the motor 11 and the detector 9, respectively. Preferably, the means 12 and 15 are part of a personal computer. The personal computer also comprises means 13 for determining a temperature of the substrate 14 from the measured radiation signals. According to the present invention the means 13 is preferably an algorithm using Planck's law.

Figure 3:
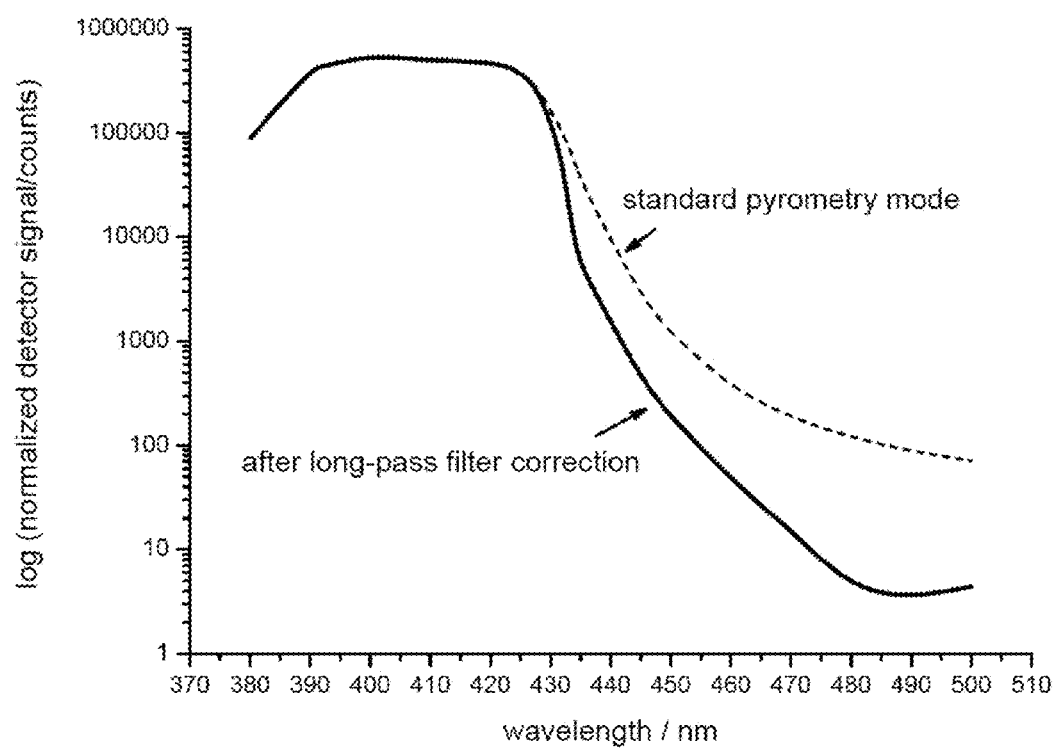
FIG. 3 shows the spectral detectivity of the pyrometer of the state of the art compared to the spectral detectivity of the pyrometer according to the invention.

FIG. 3 shows the detectivity spectrum of a pyrometer according to the state of the art (dashed line) and a pyrometer according to the present invention (solid line). Thermal radiation of a tungsten lamp was measured. As can be seen, the long-pass filter correction according to the present invention additionally attenuates the detection of vis/IR artifact light (>440 nm) by at least two orders of magnitude.

| List of reference signs | |
|---|---|
| 1 | susceptor |
| 2 | semiconducting wafer |
| 3 | IR-radiation |
| 4 | UV-radiation |
| 5 | dichroic beam splitter |
| 6 | shortpass filter |
| 7 | longpass filter |
| 8 | bandpass filter |
| 9 | detector |
| 10 | active area |
| 11 | means for alternately activating and deactivating the longpass filter |
| 12 | means for measuring a first and a second thermal radiation signal |
| 13 | means for determining a temperature of a substrate |
| 14 | substrate/sample |
| 15 | means for synchronizing the activation state of the longpass filter and data acquisition of the detector |

What is claimed is:

1. A pyrometer adapted for detecting radiation in the range of 250 to 450 nm, the pyrometer comprising:
   a detector having an active area adapted for measuring thermal radiation;
   a longpass filter having a cut-off wavelength in the range of 400 to 450 nm;
   at least one bandpass filter, wherein the bandpass filter is positioned in a straight line between the longpass filter and the detector;
   means adapted for alternately activating and deactivating the longpass filter;
   means adapted for measuring a first thermal radiation signal when the longpass filter is deactivated and adapted for measuring a second thermal radiation signal when the longpass filter is activated; and means adapted for determining a temperature corresponding to the measured thermal radiation from a difference of the first radiation signal and the second radiation signal.

2. The pyrometer of claim 1, wherein in the activated state, the longpass filter is positioned such in front of the active area of the detector that radiation to be detected passes through the longpass filter before reaching the active area of the detector, and in the deactivated state, the longpass filter is positioned such that radiation to be detected does not pass through the longpass filter before reaching the active area of the detector.

3. The pyrometer of claim 2, wherein the detector has a maximal radiation sensitivity in the range of 200 to 500 nm.

4. The pyrometer of claim 2, wherein the detector has a maximal radiation sensitivity in the range of 250 to 450 nm.

5. The pyrometer of claim 1, wherein the means for activating and deactivating the longpass filter comprises a motor, wherein the motor is adapted to deactivate the longpass filter by dislocating the longpass filter from the active area of the detector, and the motor is adapted to activate the longpass filter by locating the longpass filter in front of the active area of the detector.

6. The pyrometer of claim 5, wherein the longpass filter comprises a plurality of segments, wherein a gap is arranged between adjacent segments such that a relative movement between the longpass filter and the active area of the detector results in a sequential activation and deactivation of the longpass filter.

7. The pyrometer of claim 1, wherein the bandpass filter has a central wavelength in the range of 350 to 500 nm.

8. The pyrometer of claim 1, further comprising at least one shortpass filter, wherein the shortpass filter is positioned on a side of the longpass filter which faces away from the detector, wherein the shortpass filter is arranged along a straight line with the longpass filter and the detector.

9. The pyrometer of claim 8, further comprising at least one dichroic beam splitter, wherein the dichroic beam splitter is positioned on a side of the longpass filter which faces away from the detector.

10. The pyrometer of claim 8, further comprising at least one dichroic beam splitter, wherein the dichroic beam splitter is positioned on a side of the longpass filter which faces away from the detector and the dichroic beam splitter is arranged along a straight line with the longpass filter and the detector.

11. A method for determining a temperature of a sample emitting thermal radiation using radiation having a wavelength in the range of 250 to 450 nm, the method comprising:
measuring a thermal radiation emitted by the sample during a first acquisition time interval as a first radiation signal;
blocking radiation emitted by the sample having a wavelength shorter than 450 nm and measuring the residual thermal radiation emitted by the sample during a second acquisition time interval as a second radiation signal;
filtering the radiation signal by means of a bandpass filter;
calculating a third radiation signal as a difference of the first and second radiation signal; and
determining the temperature of the sample from the third thermal radiation signal.

12. The method of claim 11, wherein the first and/or second signal acquisition time interval is in the range of 1 to 1000 ms.

13. The method of claim 12, wherein the first radiation signal and the second radiation signal are sequentially measured between 2 to 10 times and measured values are averaged before calculating the third radiation signal; and/or wherein the ratio of the first acquisition time interval and the second acquisition time interval ranges between 0.5 and 2.

14. The method of claim 11, wherein the first and/or second signal acquisition time interval is in the range of 10 to 100 ms.

15. The method of claim 14, wherein the intensity of thermal radiation having a wavelength greater than 450 nm is attenuated by blocking said thermal radiation using one or more shortpass filters, one or more longpass filters, one or more bandpass filters, one or more dichroitic beam splitters or a full or partial combination thereof.

16. The method of claim 15, wherein the sample showing thermal radiation is a semiconducting wafer on a susceptor.

17. The method of claim 16, wherein the determined temperature of the sample is used for controlling and/or correcting the heating power of an apparatus in which the sample is processed.

18. The method of claim 15, wherein the sample showing thermal radiation is a semiconducting wafer on a susceptor, and the semiconducting wafer is transparent in the spectral range of 450 nm to 2 µm.

* * * * *